(12) United States Patent
Yang et al.

(10) Patent No.: US 10,223,078 B2
(45) Date of Patent: Mar. 5, 2019

(54) APPLICATION-TYPE INDEPENDENT DYNAMIC PLUG-IN EVALUATION TOOL

(71) Applicant: CA, Inc., New York, NY (US)

(72) Inventors: Yang Yang, Newton, MA (US); Jayaram Nori, Bellevue, WA (US)

(73) Assignee: CA, Inc., New York, NY (US)

( * ) Notice: Subject to any disclaimer, the term of this patent is extended or adjusted under 35 U.S.C. 154(b) by 330 days.

(21) Appl. No.: 15/281,001

(22) Filed: Sep. 29, 2016

(65) Prior Publication Data

US 2018/0088915 A1 Mar. 29, 2018

(51) Int. Cl.
*G06F 3/048* (2013.01)
*G06F 8/38* (2018.01)
*G06F 17/22* (2006.01)
*G06F 17/24* (2006.01)
*G06F 9/445* (2018.01)

(52) U.S. Cl.
CPC ............ *G06F 8/38* (2013.01); *G06F 9/44521* (2013.01); *G06F 17/227* (2013.01); *G06F 17/2247* (2013.01); *G06F 17/24* (2013.01); *G06F 17/248* (2013.01)

(58) Field of Classification Search
CPC ...................................................... G06F 3/048
See application file for complete search history.

*Primary Examiner* — Pei Yong Weng
(74) *Attorney, Agent, or Firm* — Gilliam IP PLLC

(57) ABSTRACT

The plug-in tool is a generic and flexible application that can run plug-ins of different types. The plug-in tool allows modifications to the plug-in, its input(s) and/or output(s) without restarting the plug-in tool. The plug-in definition contains information about the plug-in inputs and outputs (e.g., type, syntax, etc.), allowing for the ability to customize the characteristics of an input thus providing flexibility in the design and evaluation of the plug-in. In addition, the plug-in definition also provides the layout of the plug-in input and outputs. The plug-in tool may have a graphical user interface, wherein the graphical elements presented is relative to a plug-in definition. For example, instead of implementing a graphical user interface for the plug-in, the plug-in definition is created and the plug-in tool uses the information in the plug-in definition to dynamically generate the graphical user interface.

20 Claims, 8 Drawing Sheets

APPLICATION-TYPE INDEPENDENT DYNAMIC PLUG-IN EVALUATION TOOL

BACKGROUND

The disclosure generally relates to the field of data processing, and more particularly to software development, installation, and management.

A plug-in is a program that extends or upgrades the functionality of an application. For example, various plug-ins are used to add features to developer tools, search engines, and web browsers. Plug-ins are written using various programming languages such as the Groovy and Java® programming languages.

BRIEF DESCRIPTION OF THE DRAWINGS

Aspects of the disclosure may be better understood by referencing the accompanying drawings.

FIG. 1 depicts an example display of a graphical user interface on a screen of a machine hosting the plug-in tool and illustrates a plug-in being executed using the plug-in tool.

FIG. 2 depicts an example display of a graphical user interface on a screen of a machine hosting the plug-in tool after the execution of the plug-in as illustrated in FIG. 1.

DESCRIPTION

Figure 3:
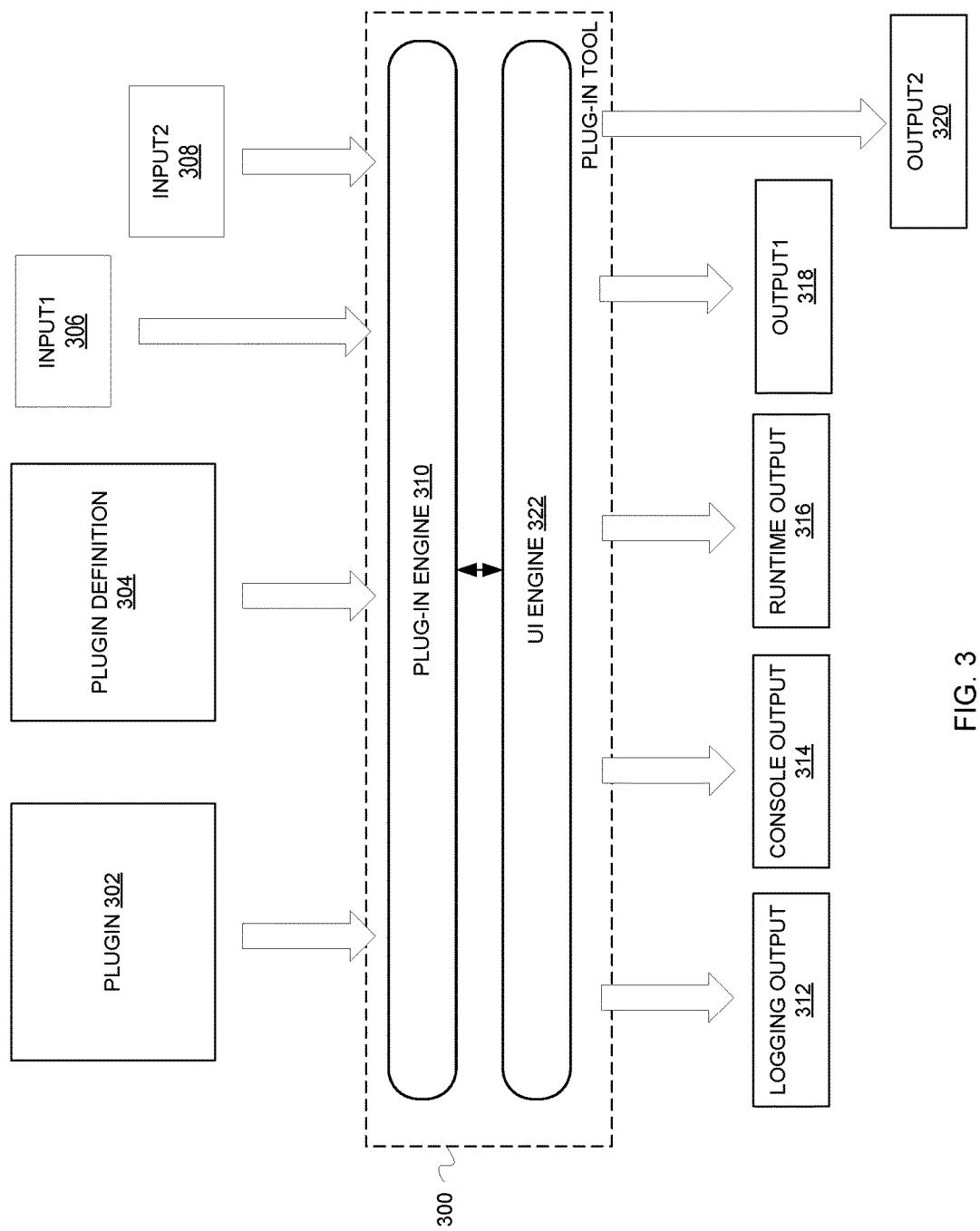
FIG. 3 depicts an example architecture of a plug-in tool.

The description that follows includes example systems, methods, techniques, and program flows that embody embodiments of the disclosure. However, it is understood that this disclosure may be practiced without these specific details. For instance, this disclosure refers to the use of a dynamic graphical user interface in illustrative examples. But aspects of this disclosure can be applied using a command line or an application program interface (API). In other instances, well-known instruction instances, protocols, structures, and techniques have not been shown in detail in order not to obfuscate the description.

Overview

Typically, a tool and/or application that runs plug-ins can only run a specific type of plug-in. As examples, a web browser runs web browser plug-ins and a database application runs database plug-ins. Maintaining different types of tools and/or applications to run different types of plug-ins is inefficient. In addition, developing a plug-in for various tasks (e.g., editing, validating and/or viewing an extensible markup language (XML) file in a grid view format, analyzing log files, generating reports and performing statistical analysis on a product's execution data) means implementing a graphical user interface for each plug-in.

The plug-in tool is a generic and flexible application that can run plug-ins of different types and dynamically generate a graphical user interface for the plug-in. The plug-in tool allows modifications to the plug-in, its input(s) and/or output(s) without restarting the plug-in tool. The plug-in definition contains information about the plug-in inputs and outputs (e.g., type, syntax, etc.), allowing for the ability to customize the characteristics of an input thus providing flexibility in the design and evaluation of the plug-in. In addition, the plug-in definition also provides the layout of the plug-in input and outputs. The plug-in tool may have a graphical user interface, wherein the graphical elements presented is relative to a plug-in definition. For example, instead of implementing a graphical user interface for the plug-in, the plug-in definition is created or generated and the plug-in tool uses the information in the plug-in definition to dynamically generate the graphical user interface.

Example Illustrations

Figure 1:
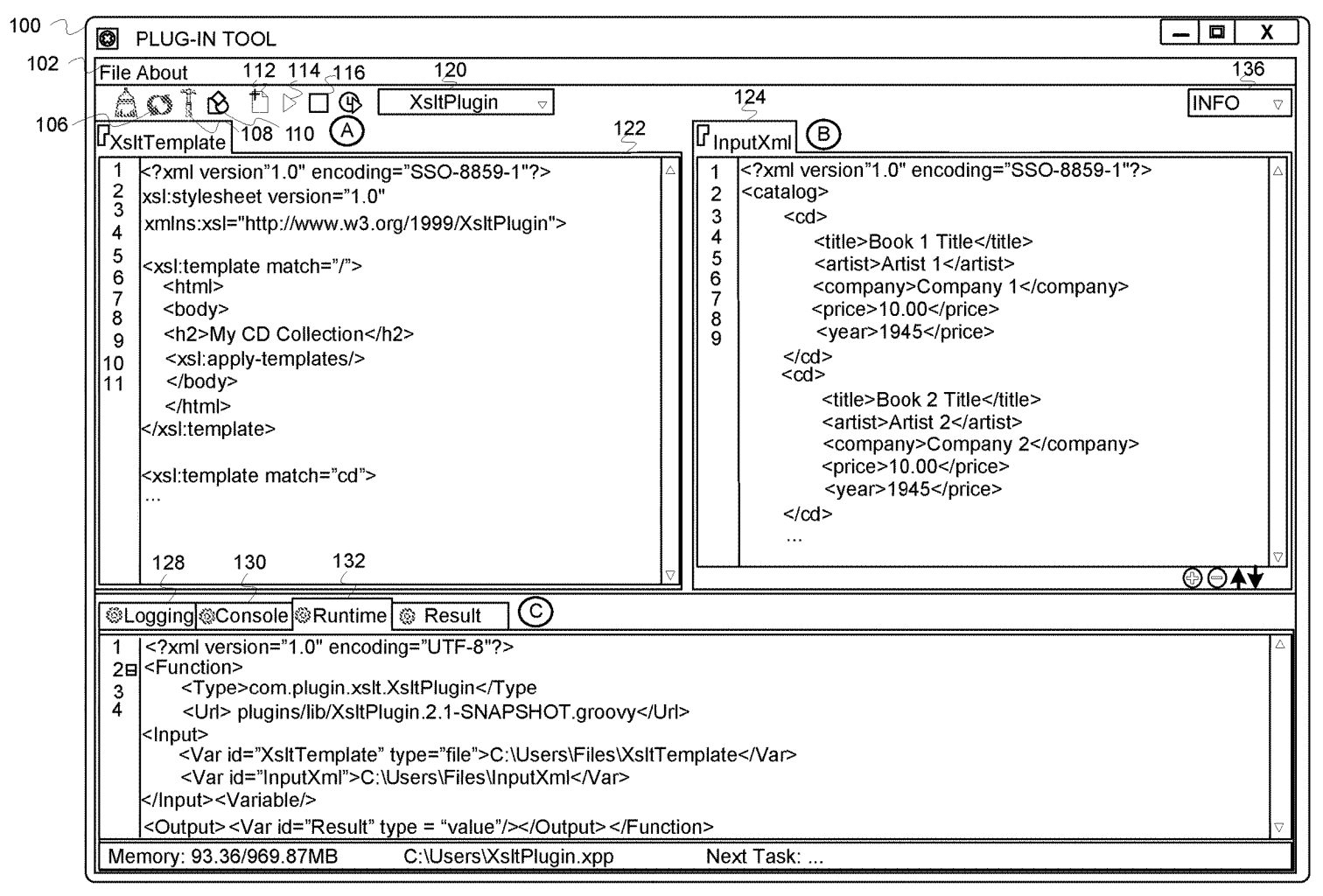

FIG. 1 depicts an example display of a graphical user interface on a screen of a machine hosting the plug-in tool and illustrates a plug-in being executed using the plug-in tool. The plug-in tool supports execution of various types of plug-ins, such as plug-ins for various application types (e.g., web browsers, database tools, text editors) and plug-ins programmed to perform various tasks. For example, the various plug-ins may perform simple network management protocol (SNMP) data collection, conversions of data from one format to another, or data comparison with graphically displayed results. The various plug-ins may be written in interpreted or compiled languages, such as Groovy or Java.

The plug-in tool includes a graphical user interface (GUI) 100 that comprises different panels, a variety of drop-down menus, and icons for common functionalities. For example, the GUI 100 includes a reload icon 106 and a hammer icon 108. Selecting the reload icon 106 resets plug-in variable values and/or state of a plug-in after an edit and/or a save operation. Selecting a hammer icon 108 displays a modal window to edit the plug-in definition. After saving the edited plug-in definition, the plug-in tool displays the edits when the reload icon 106 is clicked. This allows for an evaluation of the effects of the edits to the plug-in.

Selecting a plug-in edit icon 110 displays a modal window for editing the plug-in. A plug-in that uses a programming language that is compiled dynamically during runtime or interpreted (e.g., Groovy programming language) can be edited. Selecting a new variable icon 112 adds an external variable input. The plug-in tool also updates the plug-in definition by adding the external variable in the <Input> section. An external variable input is named as such because it is not located in the default plug-in tool library. When the new variable icon 112 is clicked, the user interface displays an "Add Variables" modal window. Several custom data types can be used as external variable inputs. These custom data types can be added using the modal window which includes value, file, map, and list. The external variable may also be a relative variable name that can be mapped to another input. Selection of a run icon 114 executes or runs the plug-in selected in a plug-in drop-down box 120. The plug-in drop-down box 120 is an input control for the plug-in tool's graphical user interface that when activated identifies or displays a list of plug-ins from which a plug-in may be selected for execution. There may be more than one input control for the plug-in tool's graphical user interface. Selecting a stop icon 116 stops the execution of a currently running plug-in.

The logging level drop-down menu 136 allows the selection of a logging level, which controls the level of granularity of data logged during execution of a plug-in. The default logging level is "info." Other logging levels include finer and finest. At the info level, the plug-in tool logs informational messages that highlight the progress of an application. At the finer level, the plug-in tool logs messages that are useful for debugging the application. At the finest level, the plug-in tool logs messages that contain more information than the finer level, such as a stack trace.

Selecting a file drop-down menu 102 displays the basic commands for managing a plug-in profile (e.g., new plug-in profile, save plug-in profile). A plug-in profile contains a set of data to run the plug-in. The profile includes dependencies located in the plug-in tool directory or library such as the plug-in definition and an input file. The plug-in is programmed to search for a library of plug-in files in the profile. A plug-in definition contains the name, type, and a uniform resource locator (URL) of the plug-in. In addition, the plug-in definition contains a set of one or more input and output parameters. Each input or output parameter contains information about the input or output which is used determine the layout of the input(s) and output(s) in the graphical user interface. Information about the inputs and outputs includes the identifier and the attributes of the inputs and/or outputs (e.g., main input, type, syntax, etc.). The attribute type indicates the kind of input or output (e.g., file, map, etc.). The attribute syntax indicates the way the input or output is structured (e.g., text/xml). The plug-in tool uses the attribute type to determine how to display and/or process the input or output. The attribute "mainInput" is a Boolean that indicates whether the input is a main input or not. An input that has the attribute mainInput set as true is a main input. An input that does not have the attribute mainInput or has the attribute mainInput set to false is referred to as an "other" input. The main input may contain format or configuration information on how to handle data contained in the other input. The main input may also be referred to as an input configuration document as the main input often includes configuration information, such as templates for formatting input data. The other input may contain data for processing by the plug-in tool. The inputs are loaded into an execution space or workspace of the plug-in tool. The plug-in tool execution space or workspace is a memory cache that contains the current state of the resources used by the plug-in tool for running the plug-in. The current state of the loaded resources is displayed in the GUI 100.

As depicted in FIG. 1, the GUI 100 is divided into two sections: the upper section and the lower section. The upper section displays the inputs while the lower section displays the plug-in outputs and other information such as logging. The upper section is further divided into a left and a right panel. The left panel displays the main inputs. The right panel displays the other inputs. In FIG. 1, the left panel displays a XsltTemplate tab 122 that displays data from an XsltTemplate Extensible Stylesheet Language Transformations (XSLT) stylesheet "XsltTemplate". The right panel displays an InputXml tab 124 that displays data from an input file "InputXml."

The lower section of the GUI 100 is divided into several tabbed document interfaces (TDI) or tabs graphical control element (hereinafter "tab"): a logging tab 128, a console tab 130, a runtime tab 132 and a result tab. The logging tab 128, the console tab 130 and the runtime tab 132 are default tabs. The default tabs are presented in the GUI automatically. Tabs other than the default tabs are the plug-in output tabs which can vary based on the plug-in definition. For example, the result tab is a plug-in output tab for the plug-in "Xslt-Plugin" as defined in the plug-in definition. The logging tab 128 contains the information on the system activities performed during the execution the of the plug-in. The system activities displayed in the logging tab 128 depends on the logging level selected in a logging level drop-down menu 136. The console tab 130 displays the terminal outputs of the running plug-in. The runtime tab 132 displays the plug-in runtime configuration. The runtime configuration contains information of the settings used in executing the plug-in. For example, the runtime configuration information contains the fully qualified name and path of the plug-in and input(s) used during the execution of the plug-in. In addition, the runtime configuration contains information on the outputs generated during execution of the plug-in (e.g., name, type, etc.). The runtime configuration may be used when creating a workflow script. In creating the workflow script, the fully qualified name of the inputs and/or outputs in the runtime configuration may be changed to relative paths. A workflow script contains statements and/or runtime configurations that calls to plug-ins. The output of a plug-in may be used as an input for the next plug-in to be called.

Figure 2:
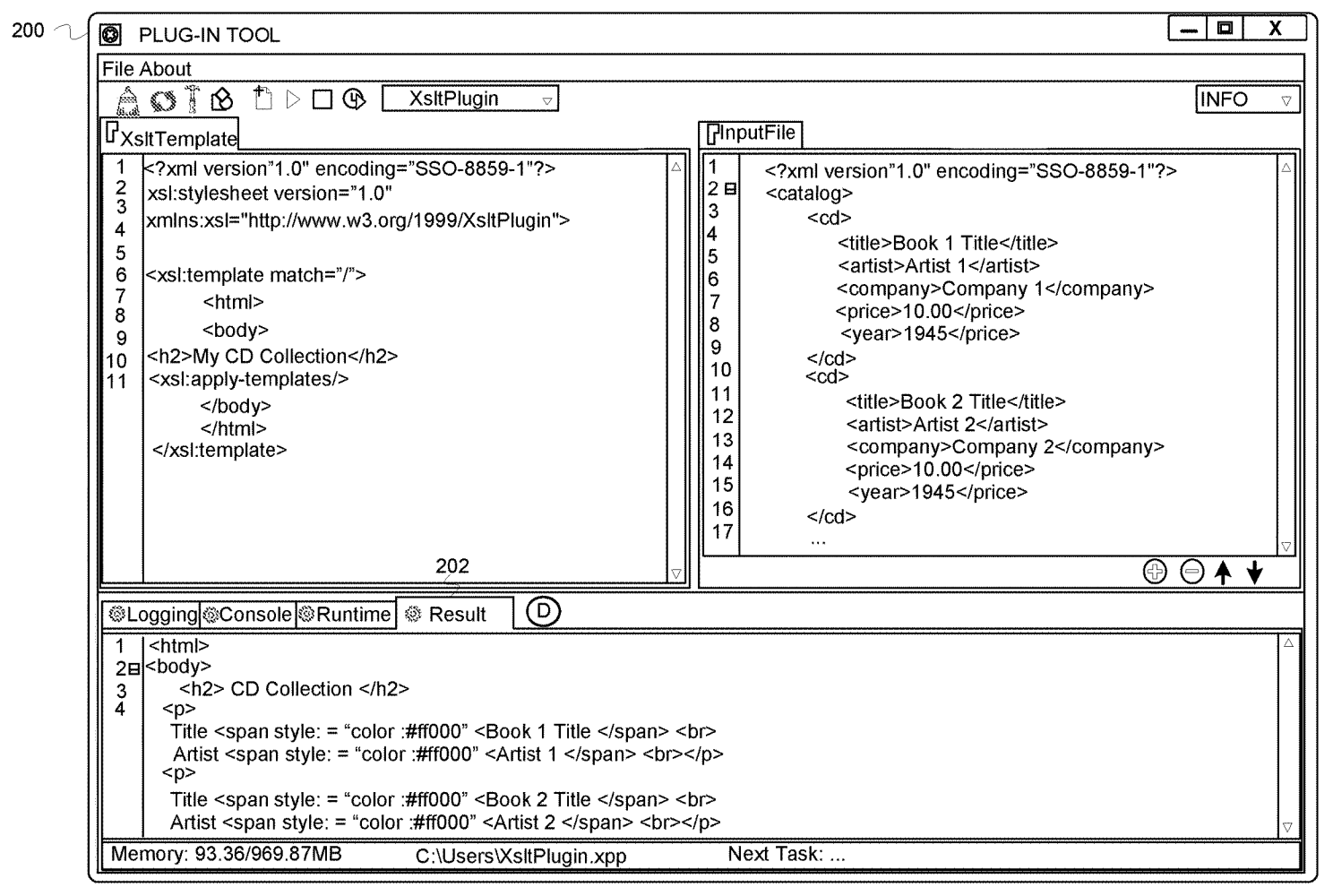

FIG. 2 depicts an example display of a graphical user interface on a screen of a machine hosting the plug-in tool after the execution of the plug-in as illustrated in FIG. 1. A result tab 202 of a GUI 200 in FIG. 2 depicts the output of a XsltPlugin plug-in execution based on the InputXml input file as shown in the InputXml tab 124 and the XsltTemplate Extensible Stylesheet Language Transformations (XSLT) stylesheet as shown in the XsltTemplate tab 122 of FIG. 1.

The following is a brief high-level overview of the different stages of operations in FIG. 1 and FIG. 2. FIGS. 1 and 2 are annotated with a series of letters A-D. These letters represent the different stages of operations. Although these stages are ordered for this example, the stages illustrate one example to aid in understanding this disclosure and should not be used to limit the claims. Subject matter falling within the scope of the claims can vary with respect to the order of some of the operations.

At stage A, the run icon 114 is clicked which generates an event that triggers the start of the execution of the XsltPlugin plug-in by the plug-in tool. The XsltPlugin is a plug-in for transforming XML documents into extensible hypertext markup language (XHTML) documents or other XML documents using a stylesheet. The plug-in is executed based on the data in the plug-in definition. At stage B, the XsltPlugin transforms the input file shown in the InputXml tab 124 using the stylesheet shown in the XsltTemplate tab 122. At stage C, a runtime configuration is generated. FIG. 2 depicts stage D. At stage D, the result tab 202 shows the transformed document (i.e. the output of the XsltPlugin).

FIG. 3 depicts an example architecture of a plug-in tool. FIG. 3 depicts a plug-in tool 300 that includes a plug-in engine 310 and a UI engine 322. As stated earlier, a plug-in definition 304 is a file that provides information on the plug-in 302 including the layout of its inputs and outputs. In this example, the inputs consist of an Input1 306 and an Input2 308. The outputs consist of an Output1 318 and an Output2 320.

The UI engine 322 displays the Output1 318 and the Output2 320. In addition, the UI engine 322 displays the default outputs: a logging output 312, a console output 314, and a runtime output 316. The logging output 312 displays system activities that occurred during the execution of the plug-in 302. The console output 314 includes information that is sent to a display terminal during the execution of the plug-in 302. The runtime output 316 contains the runtime configuration during the execution of the plug-in 302.

Figure 4:
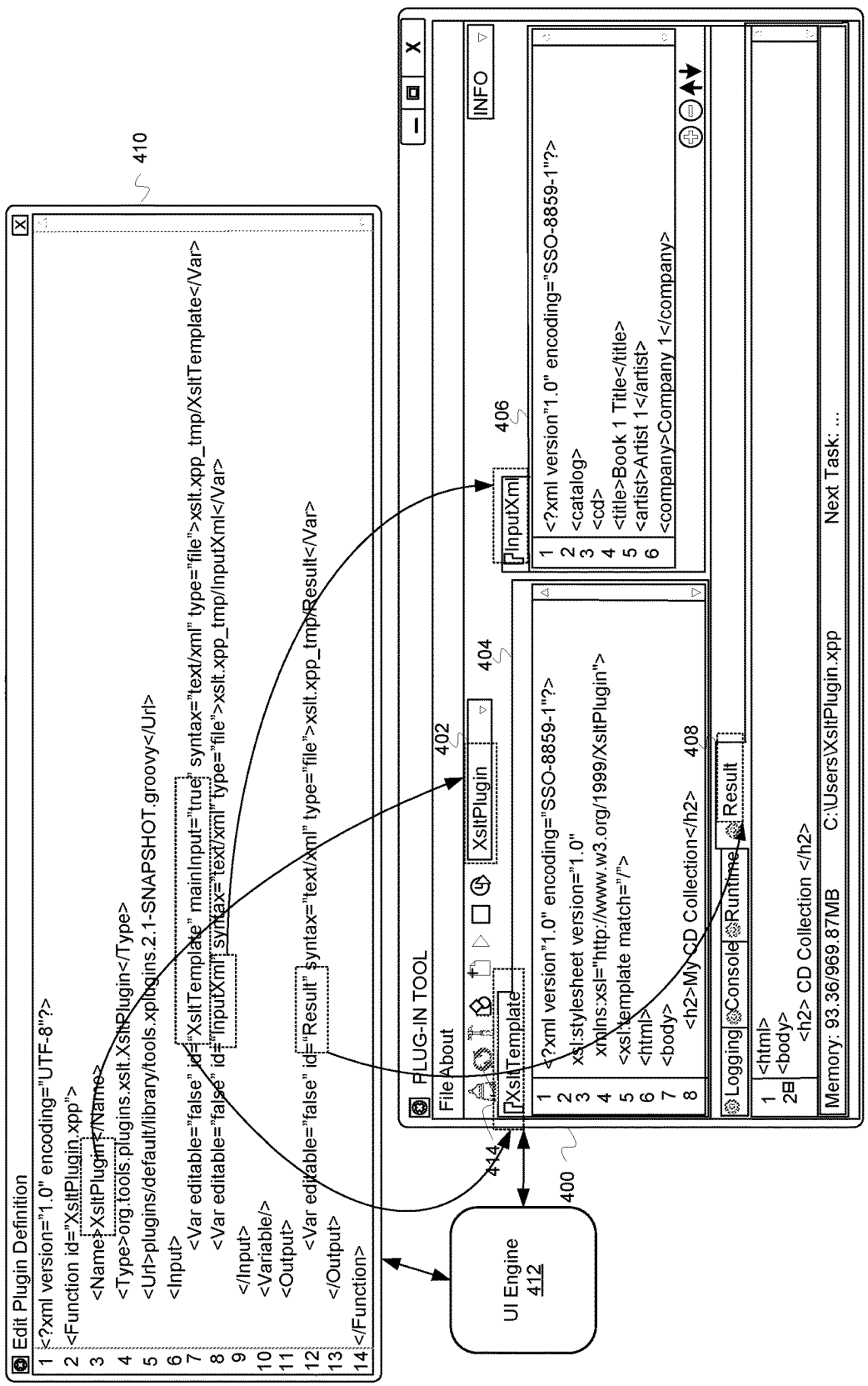
FIG. 4 depicts an example of the plug-in tool user interface (UI) engine dynamically generating content for a GUI based on the attributes of the inputs and outputs in the plug-in definition.
Figure 5:
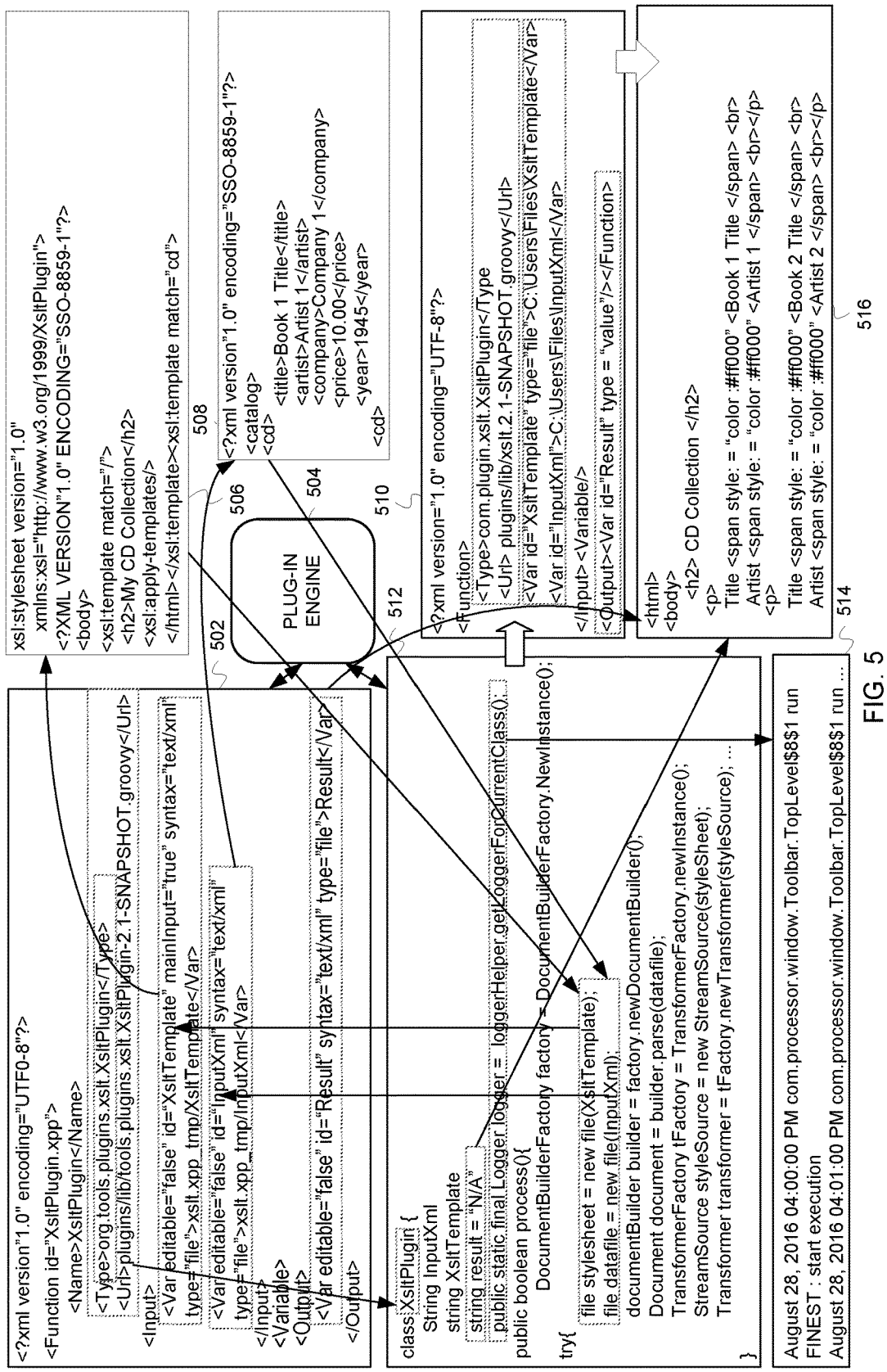
FIG. 5 depicts an example execution of the selected plug-in in FIG. 1.

With the general introduction to the plug-in tool architecture, more specific examples can be explained in FIGS. 4 and 5. FIG. 4 depicts an example of the plug-in tool UI engine dynamically generating content for a GUI based on the attributes of the inputs and outputs in the plug-in definition. In this illustration, a GUI 400 depicts a drop-down menu 402, a XsltTemplate tab 404, an InputXml tab 406, and a result tab 408.

A UI engine 412 generates the GUI 400 based on the plug-in definition 410. The <Input> section of the plug-in definition 410 contains information regarding the inputs XsltTemplate and InputXml. Since the input XsltTemplate's attribute mainInput is set as true, the UI engine 412 creates the XsltTemplate tab 404 in the left panel of the GUI 400. To determine the content of the XsltTemplate tab 404, the UI engine 412 determines the syntax and location of the input XsltTemplate using the syntax and type attributes of the input XsltTemplate in the plug-in definition 410. In this illustration, the attribute syntax for the input XsltTemplate is set to "text\xml". The attribute type for the input XsltTemplate is set to "file" followed by the location of the file. The UI engine 412 loads the XsltTemplate file from the determined location and formats the contents for display in the XsltTemplate tab 404 as an XML, document. Loading a resource (e.g., input, dependencies) means putting the resource into the execution space to be available for the plug-in tool. For example, loading an input file allows the UI engine 412 to format and display the contents of the input file.

Since the InputXml does not have an attribute mainInput, the InputXml is considered an "other" input and is displayed in the right panel of the upper section of the GUI 400. To determine the content of the InputXml tab 406, the UI engine 412 determines the syntax and location of the data for the input InputXml using the syntax and type attributes of the input InputXml in the plug-in definition 410. In this illustration, the attribute syntax of the input InputXml is set to "text\xml". The attribute type for the input InputXml is set to file followed by the location of the file. The UI engine 412 loads the InputXml file from the determined location and formats its contents for display in the InputXml tab 406 as an XML document.

The output section of the plug-in definition 410 contains information regarding the output "result". Since the result is an output, the UI engine 412 generates the result tab 408 in the lower section of the GUI 400. To determine the content of the result tab 408, the UI engine 412 determines the syntax and type attributes of the output result. In this illustration, the attribute syntax of the output result is set to "text\xml". The attribute type of the output result is set to "file" followed by the location of the result file. The UI engine 412 loads the result file from the determined location and formats its contents for display in the result tab 408 as an XML document.

The UI engine 412 listens for events and regenerates the GUI 400 when events are detected. For example, an event is triggered after a reload icon 414 is clicked. If a new input is added in the <Input> section of the plug-in definition, the UI engine 412 determines that a new input is added and, depending on whether the new input is a main input or not, places an additional tab to the left or right panel of the GUI 400. In another example, the plug-in definition may be edited wherein the mainInput attribute may be changed from true to false or vice versa. When this change is saved and the reload icon is clicked, the location of the input may be changed from the left panel to the right panel in the upper section of the graphical user interface or vice versa. Another event can be triggered by the generation of the output or result file during the execution of the plug-in. For example, if the selected plug-in is executed, an output may be generated which is then placed in the location designated in the plug-in definition 410. The plug-in engine invokes the UI engine 412 to display the output by creating an event.

FIG. 5 depicts an example execution of the selected plug-in in FIG. 1. FIG. 5 has an example plug-in definition 502 for the selected XsltPlugin plug-in from the drop-down box 120 in FIG. 1. A plug-in engine 504 resolves the input and output identifiers in the plug-in definition 502 to the parameters in the plug-in 512. The plug-in engine 504 maps each of the input and output identifiers to each of the parameters in a plug-in 512 and invokes the different methods based on the attributes of the mapped identifiers. In this example, the variable stylesheet is initialized to a parameter XsltTemplate in the plug-in 512. The plug-in 512 determines that the parameter XsltTemplate is associated with the input identifier XsltTemplate in the plug-in definition 502. The plug-in 512 uses the attributes of the input identifier XsltTemplate to retrieve an input file XsltTemplate 506 and pass the input file XsltTemplate 506 as an argument to a plug-in input variable. The input file may be passed by reference or by value. The plug-in engine 504 is programmed to search a path(s) for a library of plug-in files. The plug-in engine 504 performs similar operations for the other parameters and/or input variables in the plug-in such as resolving the parameter inputXml to an input file InputXml 508.

A runtime configuration 510 and a result 516 are generated during the execution of a plug-in 512. In this example, the XsltPlugin plug-in transforms the input file InputXml 508 using the input file XsltTemplate 506 into the result 516. In addition, the system activities during the execution of the plug-in 512 are displayed in a logging output 514.

Figure 6:
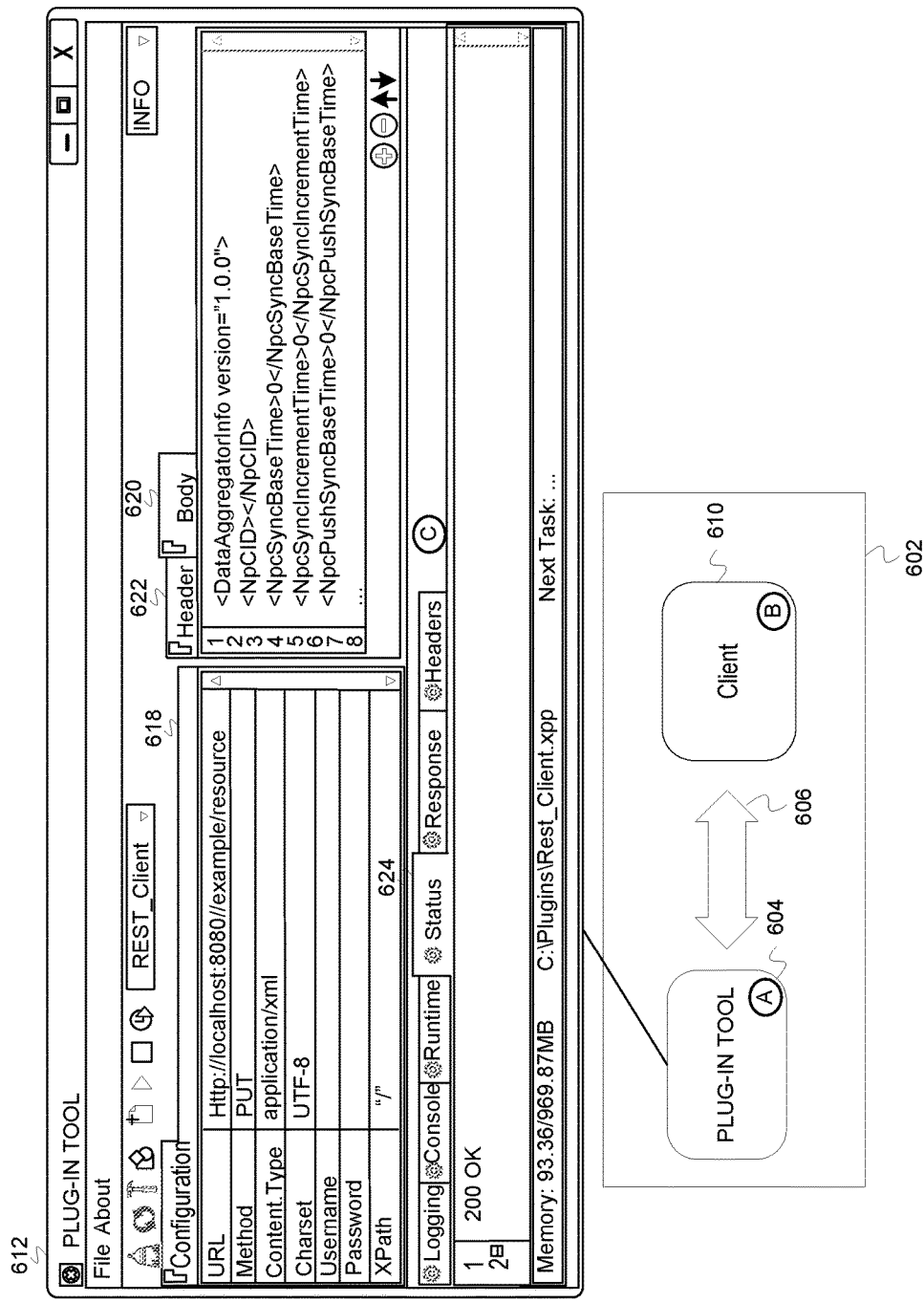
FIG. 6 illustrates execution of a plug-in for handling Representational State Transfer (REST) client requests using the plug-in tool.

FIG. 6 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order of some of the operations.

FIG. 6 illustrates execution of a plug-in for handling Representational State Transfer (REST) client requests using the plug-in tool. FIG. 6 depicts a machine 602, a plug-in tool 604, a client 610, and a bus 606. The machine 602 hosts the plug-in tool 604 and the client 610.

Prior to stage A, the plug-in tool 604 generates a GUI 612 based on the resolved input and output information in a plug-in definition (not depicted). In the current example, the upper section of the GUI 612 includes a configuration tab 618 in the left panel. The right panel has a body tab 620, and a header tab 622. The lower section of the GUI 612 includes a logging tab, a console tab, a runtime tab, a status tab 624, a response tab, and a headers tab.

The configuration tab 618 contains the configuration information to format the Representational State Transfer (REST) request that will be sent to the client, such as URL, method, content type, "charset" (i.e. character set), username, password, and XPath. The URL identifies the request resource or collection of resources in the client 610. The request operation is determined by the method. The content-type describes the content being sent with the HTTP request. In the current example, the content type is "application\xml" which tells the client that the data being sent in the request is in XML, format. The header tab 622 contains the header information for the request. The header contains information about the message and the sender (e.g., format type of the message body). The body tab 620 contains the actual message. The configuration input in the GUI 612 is an example of the flexibility enabled by using the plug-in tool to execute plug-ins. In this example, the REST request parameters can be configured by adding the parameters to the configuration input instead of relying on defaults. For example, the default timeout for a request is 60 seconds. For a shorter or longer timeout, a timeout variable can be added in the configuration input. In another example, to use a different character set for a REST request to a resource deployed in Asia or Europe, the charset variable can be edited in the configuration input.

At stage A, the plug-in tool 604 sends a PUT request based on the information on the inputs configuration, header, and body via the bus 606. The PUT request updates a resource in the client 610. At stage B, the client 610 executes the PUT request and updates the resource. If the update is successful, the client 610 sends a response to the plug-in tool 604. At stage C, the plug-in tool receives and parses the response. The plug-in tool displays the response status code in the status tab 624. The response status code "200 OK" depicted in the status tab 624 means that the update was successful.

Figure 7:
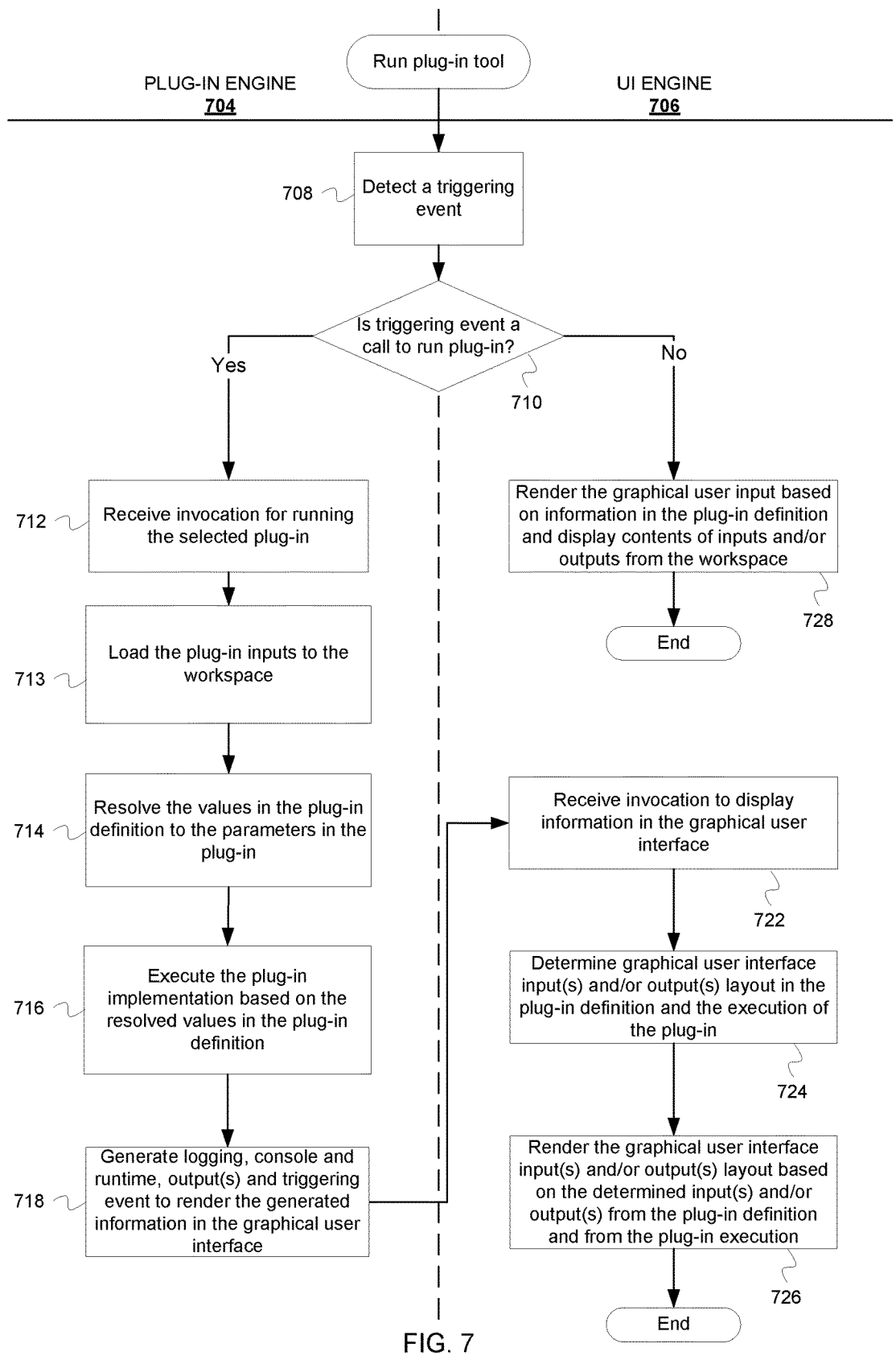
FIG. 7 is a flowchart of example operations for running a plug-in using the plug-in tool.

FIG. 7 is a flowchart of example operations for running a plug-in using the plug-in tool. The description in FIG. 7 refers to a plug-in engine (704) and a UI engine (706) of a plug-in tool as performing the example operations for consistency with FIG. 3.

A plug-in tool detects a triggering event notification (708). A triggering event notification is created when a defined action has occurred, such as selecting a value from a drop-down menu or clicking a reload or a run icon in the graphical user interface. Additionally, the triggering event notification may have been generated in response to a method call, a command received via a command line, or an API call. The plug-in tool is programmed to listen for event notifications. The plug-in tool analyzes the triggering event notification to determine whether the notification indicates a call to the plug-in engine 704 or the UI engine 706 (710). In some instances, a call to the plug-in engine 704 also results in a call to the UI engine 706, or vice versa. For example, selecting a plug-in from the plug-in drop-down menu is a triggering event that results in two calls: a call to the plug-in engine 704 to load the plug-in definition and inputs into the workspace and an eventual call to the UI engine 706 to render the user interface layout based on the plug-in definition and to display the values of the loaded inputs accordingly.

If the triggering event or input is a call to run a plug-in, the plug-in engine 704 receives the invocation to run the selected plug-in (712). The invocation includes the plug-in definition identifier. Other information such as the version of the plug-in may also be included. In other embodiments, the plug-in definition is passed to the plug-in engine 704. The plug-in engine 704 loads the inputs into the workspace to make the inputs available for execution of the plug-in tool and display in the GUI (713). The plug-in engine 704 loads the inputs after receiving a triggering event (e.g., the save icon is clicked). The plug-in tool graphical user interface provides an editor to write or edit text (e.g., inputs, plug-in definition, plug-in execution class). Before saving, the edits reside in the graphical user interface memory. After saving, the edited text is loaded into the workspace. If the edited text is a data type "file" then the file path is also passed to the plug-in tool. For certain data types (e.g., file) the plug-in tool is programmed to load the input from a disk instead of the memory. In addition, the plug-in engine may also determine if the workspace contains inputs associated with the selected plug-in before execution. If the plug-in engine 704 determines that the workspace does not contain the plug-in inputs, the plug-in engine 704 loads the inputs from the default directory based on the plug-in definition.

The plug-in engine 704 maps or resolves the values in the plug-in definition to the parameters in the plug-in (714). As stated earlier, the plug-in definition contains the identifier, name, and location of the plug-in and its inputs and outputs.

The plug-in engine 704 executes the plug-in based on the resolved values from the plug-in definition (716). The plug-in engine 704 generates the defined output(s). The plug-in engine 704 also generates information for display in the logging, console and runtime tabs. At the start of the plug-in execution, the plug-in engine 704 then triggers an event for the UI engine 706 to display certain generated information and/or output(s) in the graphical user interface (e.g., the logging and console outputs) as they are generated (718). After execution of the plug-in, the plug-in engine 704 triggers an event for the UI engine 706 to display the outputs generated by the execution of the plug-in. The plug-in engine 704 also posts the generated information and/or output to the plug-in tool default directory.

The UI engine 706 detects an event notification to display an information to the GUI. (722). The UI engine 706 detects an event notification by listening or subscribing to certain events. An event may be a change in the state of an object such as an interaction with the GUI. The UI engine 706 can be implemented using the Java programming language ActionListener interface to listen for events.

After detecting the triggering event, the UI engine 706 determines the GUI inputs and/or outputs based on the plug-in definition, event, and/or execution of the plug-in (724). For example, if the triggering event is to display the output, the UI engine 706 may determine the text in the output or output data for display and ignore the text in the input or input data. As stated earlier, the UI engine 706 determines the input parameters inside the <Input> section of the plug-in definition. The UI engine 706 also determines the output data inside the <Output> section of the plug-in definition. Various information for each input and output are also determined, such as the format of the data and its location. The UI engine 706 determines the information by parsing the plug-in definition. The UI engine 706 may parse the plug-in definition by implementing a Java programming language abstract class DocumentBuilderFactory for example. In addition, the UI engine 706 is programmed to search for information in the plug-in tool default directory. The UI engine 706 may also be programmed to retrieve the information for display from the execution workspace if available, instead of parsing the plug-in definition every time the GUI is refreshed.

After determining the inputs and outputs in the plug-in definition, the UI engine 706 may generate a user interface tab for each determined input or output and/or update the displayed data (726). For example, the UI engine 706 may use a JTabbedPane addTab or insertTab method in the Java programming language. The aforementioned methods may be called to add or insert an input tab in the upper section of the graphical user interface for each input parameter inside <Input> section. The JTabbedPane addTab or insertTab method may also be called to add or insert an output tab in the lower section of the graphical user interface for each output inside <Output> section. If the inputs and/or outputs already have a user interface tab, the UI engine 706 updates the displayed text instead. The input data types include file, table, map, and property grid. The property grid is similar to a map plus additional features such as the ability to add a drop-down menu. The output data types include value, file, map, list, and table. The outputs may be displayed in text, table, graph or another format. In addition, the output can be rendered as a Hyper Text Markup Language (HTML) page.

If the triggering event or input is a call to render the graphical user interface, the UI engine 706 receives the invocation (728). The invocation includes information about the plug-in definition. The information allows the UI engine 706 to identify the plug-in definition such as an identifier or the name of the plug-in definition. As stated earlier, the plug-in definition provides the layout and display format of the inputs and outputs and its contents to the graphical user interface. The UI engine 706 parses the plug-in definition and determines the layout and display attributes for each input or output parameter (e.g., mainInput, syntax). In another example, the UI engine 706 may first determine if the layout and display information are already available in the workspace, such as during a reload. The UI engine 706 will only parse the plug-in definition if it is the first time to load the plug-in definition into the workspace or if there is a change in the plug-in definition and/or the inputs or outputs.

Variations

The above example illustrations presume default outputs such as the logging, console, and runtime outputs. In other embodiments, the plug-in tool may be configured to display any or none of the default outputs depicted. The above example illustrations also presume the use of a GUI when running a plug-in. In other embodiments, the plug-in tool may be configured wherein the plug-in engine may be invoked through a command line or an API. In addition, the above example illustrations presume the plug-in tool as a localized process. In other embodiments, the plug-in tool may be hosted on a server and be able to communicate across other processes and/or clients in a distributed network.

The examples often refer to a UI engine. The UI engine is a construct used to refer to the implementation of functionality for rendering the graphical user interface of the application-type independent dynamic plug-in evaluation tool. This construct is utilized since numerous implementations are possible. The term is used to efficiently explain the content of the disclosure. Although the examples refer to operations being performed by the UI engine, different entities can perform different operations. For instance, a dedicated co-processor or application specific integrated circuit can display the events logged during the plug-in execution.

The examples often refer to a plug-in engine. The plug-in engine is a construct used to refer to the implementation of functionality for application-type independent dynamic plug-in evaluation tool. This construct is utilized since numerous implementations are possible. The term is used to efficiently explain the content of the disclosure. Although the examples refer to operations being performed by the plug-in engine, different entities can perform different operations. For instance, a dedicated co-processor or application specific integrated circuit can display the events logged during the plug-in execution.

The examples often refer to the plug-in tool comprised of a plug-in engine and a UI engine. In other embodiments, the plug-in tool may perform the functionality of the plug-in engine and the UI engine. In yet other embodiments, the plug-in tool may be comprised of the plug-in engine, wherein the plug-in engine may perform the function(s) of the UI engine.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel, and the operations may be performed in a different order. For example, the operations depicted by blocks 718 and 722 can be performed in parallel. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of the platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or a combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object-oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
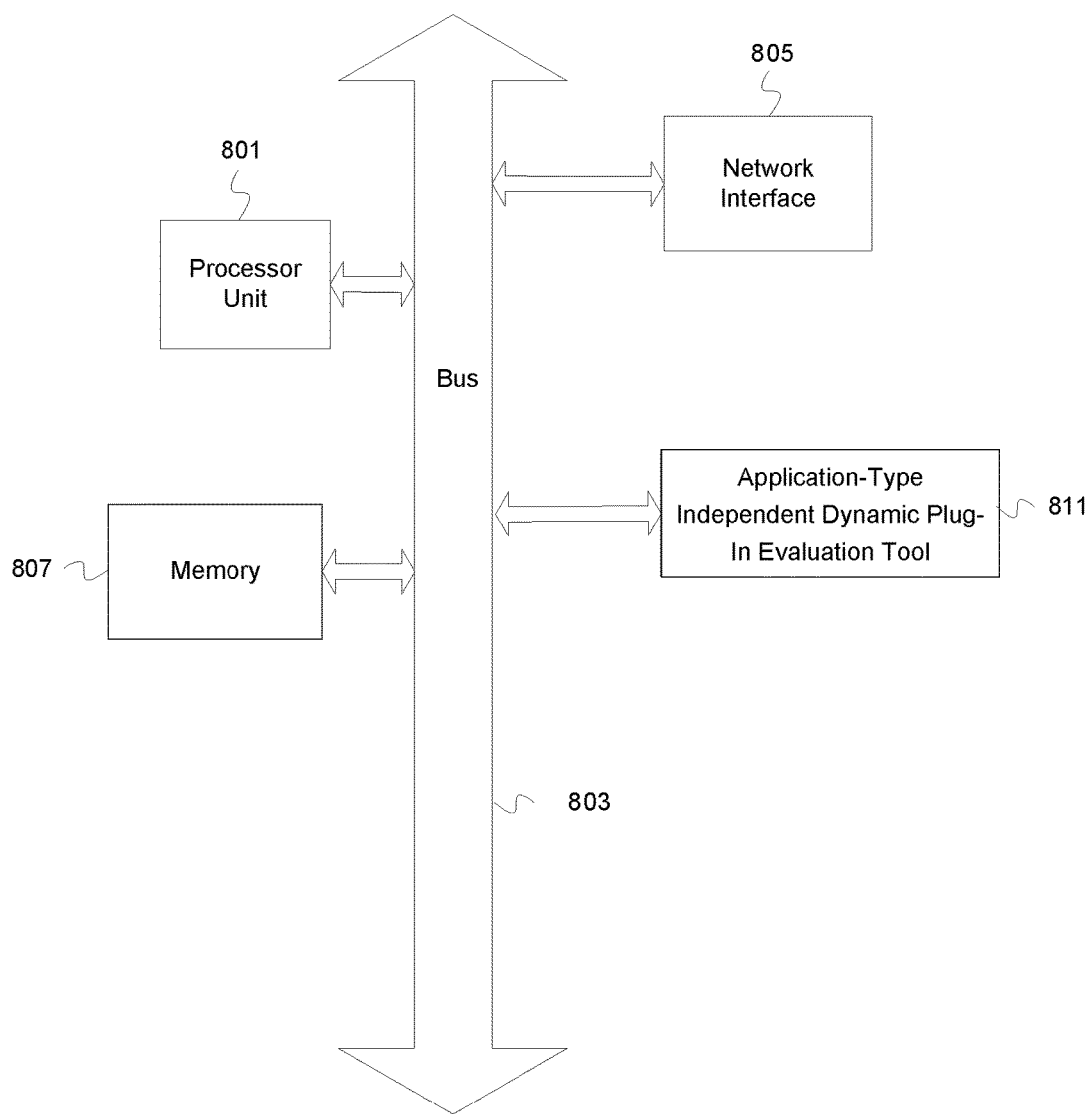
FIG. 8 depicts an example computer system with an Application-Type Independent Dynamic Plug-In Evaluation Tool.

FIG. 8 depicts an example computer system with an application-type independent dynamic plug-in evaluation tool. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes the application-type independent dynamic plug-in evaluation tool 811. The application-type independent dynamic plug-in evaluation tool 811 runs selected plug-ins or custom code implementations. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for running plug-ins or custom code as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

The description refers to a plug-in engine. An "engine" refers to a program instance that carries a task or tasks dispatched from another program instance that calls, instantiates, or invokes the engine. State information is maintained for the engine to return a task result to the program instance that dispatched the task. A context switch may occur between the dispatching program instance and the engine. Instead of a context switch, the dispatching program instance may maintain information to track the state of the dispatched task and continue performing other operations, such as dispatching another task to the engine or another engine.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
presenting a graphical user interface comprising a first input control that identifies a plurality of plug-ins, wherein the plurality of plug-ins are for different types of applications;
in response to selection of a first plug-in of the plurality of plug-ins with the first input control, loading a first plug-in definition for the first plug-in, wherein the first plug-in definition comprises a set of one or more input parameters and a set of one or more output parameters for the first plug-in;
determining that a first input parameter of the set of input parameters identifies a first input configuration document;
loading the first input configuration document and presenting a configuration indicated in the first input configuration document in a first section of the graphical user interface that allows editing of the first input configuration document;
determining that a second input parameter of a plurality of input parameters identifies an input file;
loading the input file and presenting input data indicated in the input file in a second section of the graphical user interface;
mapping the first input parameter to a first input variable of the first plug-in and the second input parameter to a second input variable of the first plug-in, wherein the first input variable and the second input variable are indicated in program code of the first plug-in;
mapping the set of one or more output parameters to a corresponding set of one or more output variables of the plug-in indicated in the program code of the first plug-in; and in response to selection of a second input control to run the first plug-in,
  running the first plug-in in accordance with the configuration as presented in the first section and the input data as presented in the second section; and
  updating a third section of the graphical user interface to present results of the running of the first plug-in in accordance with the configuration as presented in the first section and the input data as presented in the second section.

2. The method of claim 1 further comprising:
in response to determining that the first input parameter has been modified to identify a second input configuration document,
  loading the second input configuration document and presenting a configuration indicated in the second input configuration document in the first section of the graphical user interface; and
  remapping the first input parameter to the first input variable of the first plug-in.

3. The method of claim 1 further comprising, in response to detection of a change to a value of an attribute associated with the second input parameter, moving presentation of the input file from the second section of the graphical user interface to the first section of the graphical user interface.

4. The method of claim 1 further comprising, during the running of the first plug-in, presenting logging information in the graphical user interface in accordance with a selected level of granularity for the logging information, wherein the graphical user interface allows selection from a pre-defined set of levels of granularity for logging information.

5. The method of claim 1 further comprising, in response to selection of a second plug-in from the plurality of plug-ins, modifying the graphical user interface to display inputs and outputs for the second plug-in in accordance with a second plug-in definition associated with the second plug-in.

6. The method of claim 1 further comprising, after the running of the first plug-in, providing runtime configuration information of the first plug-in to a second plug-in of the plurality of plug-ins, wherein the runtime configuration information is determined based, at least in part, on the first plug-in definition, wherein the second plug-in uses the runtime configuration information to identify the results of the running of the first plug-in.

7. The method of claim 1, further comprising formatting the results of the running of the first plug-in in accordance with attributes corresponding to the set of one or more output parameters.

8. The method of claim 1 further comprising, in response to selection of a third input control, presenting a modal window that allows editing of the program code of the first plug-in.

9. One or more non-transitory machine-readable media comprising program code for executing a plug-in, the program code to:
  present a graphical user interface comprising a first input control that identifies a plurality of plug-ins, wherein the plurality of plug-ins are for different types of applications;
  in response to selection of a first plug-in of the plurality of plug-ins with the first input control, load a first plug-in definition for the first plug-in, wherein the first plug-in definition comprises a set of one or more input parameters and a set of one or more output parameters for the first plug-in;
  determine that a first input parameter of the set of input parameters identifies a first input configuration document;
  load the first input configuration document and present a configuration indicated in the first input configuration document in a first section of the graphical user interface that allows editing of the first input configuration document;
  determine that a second input parameter of a plurality of input parameters identifies an input file;
  load the input file and present input data indicated in the input file in a second section of the graphical user interface;
  map the first input parameter to a first input variable of the first plug-in and the second input parameter to a second input variable of the first plug-in, wherein the first input variable and the second input variable are indicated in program code of the first plug-in;
  map the set of one or more output parameters to a corresponding set of one or more output variables of the plug-in indicated in the program code of the first plug-in; and
  in response to selection of a second input control to run the first plug-in,
    run the first plug-in in accordance with the configuration as presented in the first section and the input data as presented in the second section; and
    update a third section of the graphical user interface to present results of the running of the first plug-in in accordance with the configuration as presented in the first section and the input data as presented in the second section.

10. The non-transitory machine-readable media of claim 9 further comprising program code to:
  in response to detection of a change to a value of an attribute associated with the second input parameter, move presentation of the input file from the second section of the graphical user interface to the first section of the graphical user interface.

11. The non-transitory machine-readable media of claim 9 further comprising program code to:
  after the running of the first plug-in, provide runtime configuration information of the first plug-in to a second plug-in of the plurality of plug-ins, wherein the runtime configuration information is determined based, at least in part, on the first plug-in definition, wherein the second plug-in uses the runtime configuration information to identify the results of the running of the first plug-in.

12. The non-transitory machine-readable media of claim 9 further comprising program code to:
  in response to a determination that the first input parameter has been modified to identify a second input configuration document,
    load the second input configuration document and present a configuration indicated in the second input configuration document in the first section of the graphical user interface; and
    remap the first input parameter to the first input variable of the first plug-in.

13. An apparatus comprising:
a processor; and
a machine-readable medium having program code executable by the processor to cause the apparatus to, present a graphical user interface comprising a first input control that identifies a plurality of plug-ins, wherein the plurality of plug-ins are for different types of applications;

in response to selection of a first plug-in of the plurality of plug-ins with the first input control, load a first plug-in definition for the first plug-in, wherein the first plug-in definition comprises a set of one or more input parameters and a set of one or more output parameters for the first plug-in;

determine that a first input parameter of the set of input parameters identifies a first input configuration document;

load the first input configuration document and present a configuration indicated in the first input configuration document in a first section of the graphical user interface that allows editing of the first input configuration document;

determine that a second input parameter of a plurality of input parameters identifies an input file;

load the input file and present input data indicated in the input file in a second section of the graphical user interface;

map the first input parameter to a first input variable of the first plug-in and the second input parameter to a second input variable of the first plug-in, wherein the first input variable and the second input variable are indicated in program code of the first plug-in;

map the set of one or more output parameters to a corresponding set of one or more output variables of the plug-in indicated in the program code of the first plug-in; and in response to selection of a second input control to run the first plug-in,
run the first plug-in in accordance with the configuration as presented in the first section and the input data as presented in the second section; and
update a third section of the graphical user interface to present results of the running of the first plug-in in accordance with the configuration as presented in the first section and the input data as presented in the second section.

14. The apparatus of claim 13 further comprising program code executable by the processor to cause the apparatus to:
in response to determining that the first input parameter has been modified to identify a second input configuration document,
load the second input configuration document and present a configuration indicated in the second input configuration document in the first section of the graphical user interface; and
remap the first input parameter to the first input variable of the first plug-in.

15. The apparatus of claim 13 further comprising program code executable by the processor to cause the apparatus to:
in response to detection of a change to a value of an attribute associated with the second input parameter, move presentation of the input file from the second section of the graphical user interface to the first section of the graphical user interface.

16. The apparatus of claim 13 further comprising program code executable by the processor to cause the apparatus to:
during the running of the first plug-in, present logging information in the graphical user interface in accordance with a selected level of granularity for the logging information, wherein the graphical user interface allows selection from a pre-defined set of levels of granularity for logging information.

17. The apparatus of claim 13 further comprising program code executable by the processor to cause the apparatus to:
in response to selection of a second plug-in from the plurality of plug-ins, modify the graphical user interface to display inputs and outputs for the second plug-in in accordance with a second plug-in definition associated with the second plug-in.

18. The apparatus of claim 13 further comprising program code executable by the processor to cause the apparatus to:
after the running of the first plug-in, provide runtime configuration information of the first plug-in to a second plug-in of the plurality of plug-ins, wherein the runtime configuration information is determined based, at least in part, on the first plug-in definition, wherein the second plug-in uses the runtime configuration information to identify the results of the running of the first plug-in.

19. The apparatus of claim 13 further comprising program code executable by the processor to cause the apparatus to:
format the results of the running of the first plug-in in accordance with attributes corresponding to the set of one or more output parameters.

20. The apparatus of claim 13, further comprising program code executable by the processor to cause the apparatus to:
in response to selection of a third input control, present a modal window that allows editing of the program code of the first plug-in.

* * * * *